Sept. 3, 1946.　　　　E. R. SNAVELY　　　　2,407,036
AIR-CONDITIONING CONTROL
Filed Aug. 21, 1942　　　　2 Sheets-Sheet 1
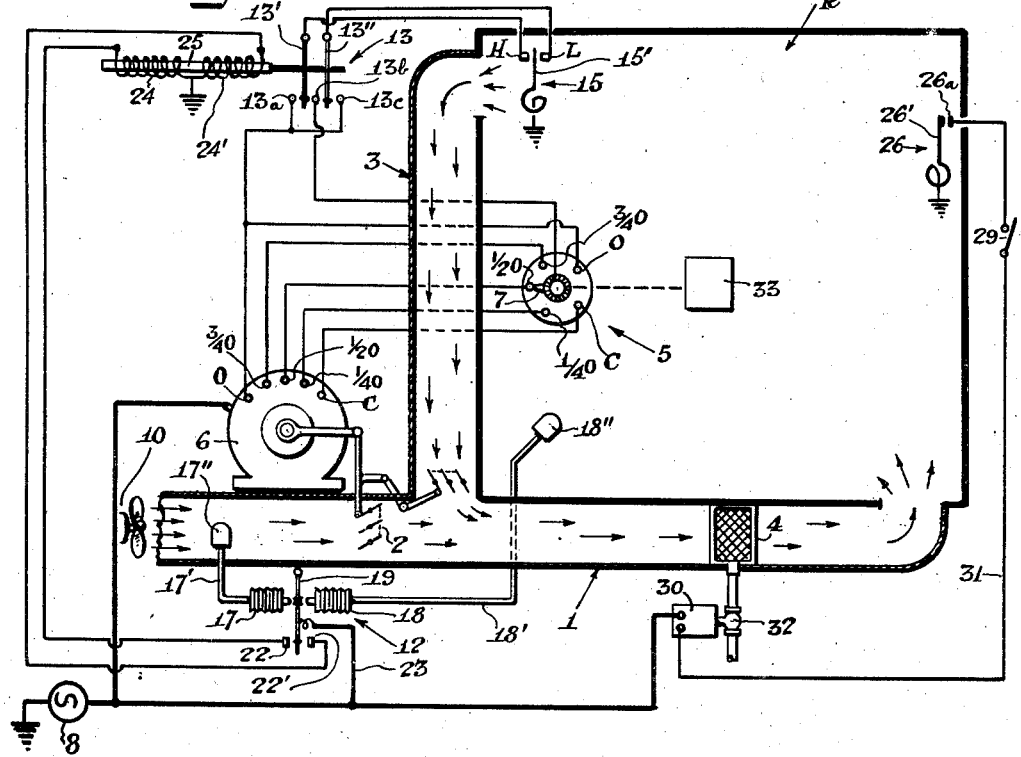
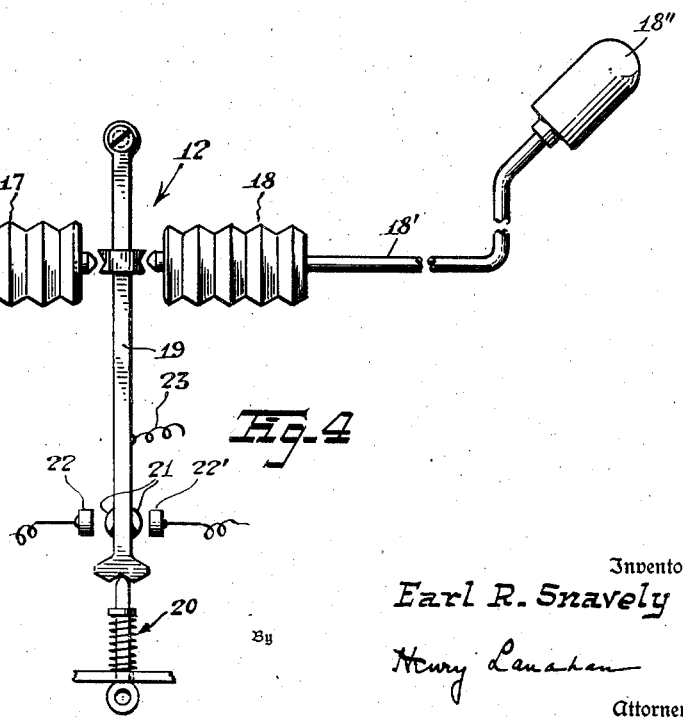
Inventor
Earl R. Snavely
By
Henry Lanahan
Attorney

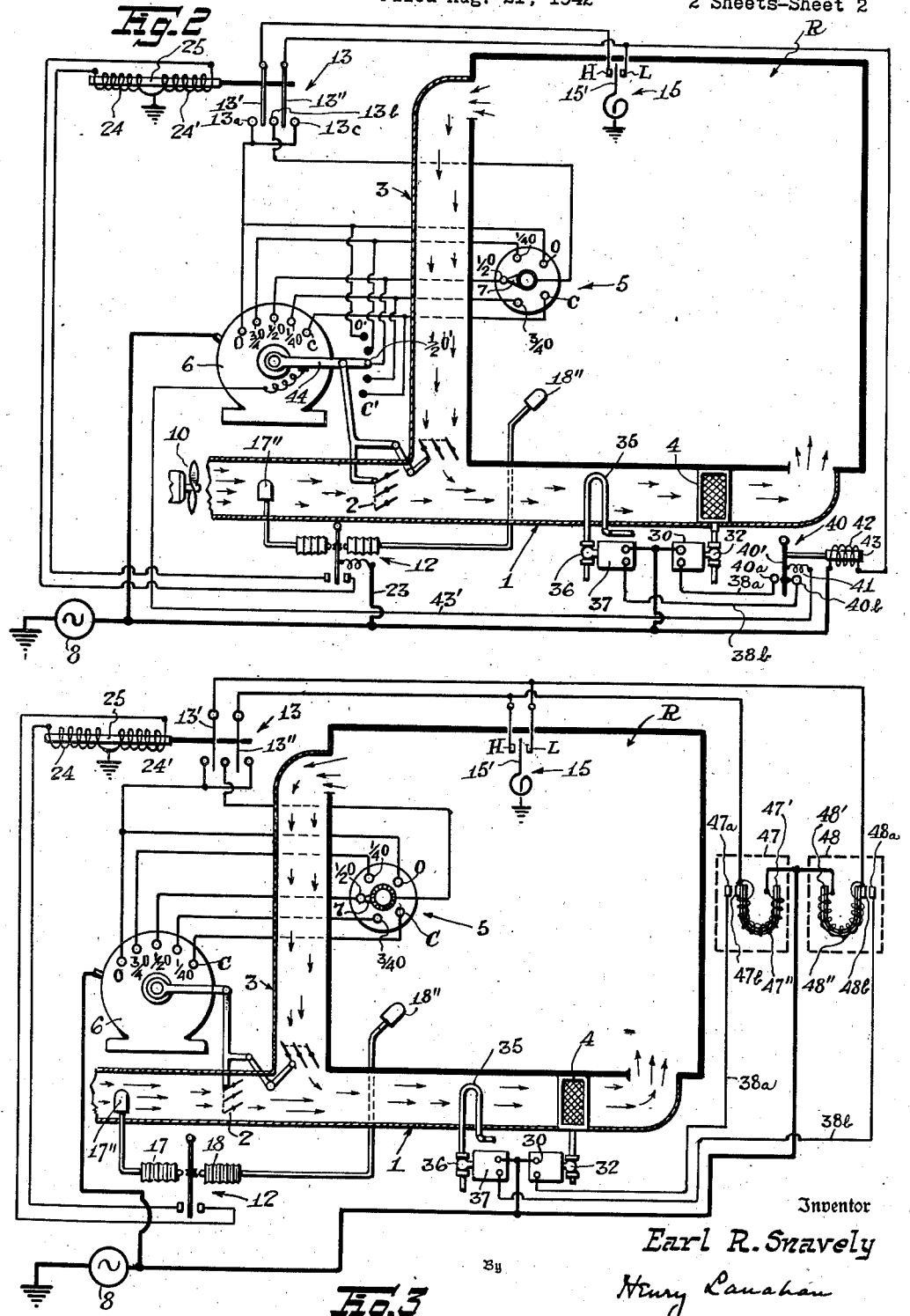

Patented Sept. 3, 1946

2,407,036

UNITED STATES PATENT OFFICE 2,407,036

AIR-CONDITIONING CONTROL

Earl R. Snavely, Roselle, N. J., assignor to Thomas A. Edison, Incorporated, West Orange, N. J., a corporation of New Jersey Application August 21, 1942, Serial No. 455,564

22 Claims. (Cl. 257—3)

This invention relates to air-conditioning systems and more particularly to a system for controlling the temperature and volume of the air delivered to a room or enclosure, such as a restaurant, auditorium, etc.

The operation of my control system is dependent in some respects upon relative conditions rather than actual conditions, depending for instance upon the difference between outside temperature and the inside temperature of the space to be controlled, the number of people present, whether they are sitting quietly or moving about, the condition of the atmosphere, etc.

Usually the outside temperature is different from the inside temperature of the room to be controlled. Sometimes this is in favor of the control system, as whenever the inside temperature is at variance in one direction from the value of temperature desired and the outside temperature is at variance in the other direction from that desired value, for then a correction of the inside temperature is attainable simply by admitting variable quantities of outside air. For example, when the inside temperature in a room or building is too high, as from being crowded with people or from stored heat in the building or otherwise, while yet the outside temperature is too cool, then it is advisable to admit a maximum amount of the outside air. On the other hand, when both the inside and outside temperatures are too high or too low with respect to the normal value of temperature desired for the inside, then it is important that the amount of outside air which is admitted shall not be more than that required to maintain the inside air fresh and free from foulness such as from cigarette smoke, cooking odors, etc., for otherwise there would be involved a wasteful processing of a large proportion of the outside air which is admitted. It may for instance be noted that when a restaurant having a maximum accommodation for 500 patrons is filled to capacity, the inside temperature may become too high due to the body heat of the people. Obviously, under these circumstances it is uneconomical to operate a cooling system to maintain the inside air at say 70° if cool outside air is available. On the contrary, if only a few people are in the restaurant and the outside air is very cold, it would be very uneconomical to admit enough fresh outside air for 500 people, as then there would be required a heating of large quantities of the outside air which would be unused. Likewise, it would be uneconomical to admit large quantities of fresh outside air sufficient for 500 people when only a few people are in the restaurant and the outside temperature is high, say 90° or more, for otherwise there would be required a cooling of large quantities of air which would not be used.

The object of my invention is to provide an air-conditioning control system which is regulated for maximum efficiency according to the differential of the outside and inside temperatures and to the quantity of fresh air required, taking into account such varying factors as the number of people present at any one time and the condition of the air within the room or enclosure being controlled, etc.

It is another object to provide novel, efficient and advantageous control arrangements for air-conditioning systems.

These and other objects of my invention will more fully appear from the following description and the appended claims.

In the description of my invention reference is had to the accompanying drawings of which:

Figure 1 is a diagrammatic illustration according to one embodiment of my invention;

Figures 2 and 3 are diagrammatic illustrations of alternative embodiments of my invention; and Figure 4 is a partial view of a differential thermostatic control as is employed in the embodiments of my invention.

Reference being had to Figure 1, there will be seen an embodiment of my invention adapted for conditioning air of a room R such, for example, as a restaurant, auditorium or other substantially enclosed space. This air-conditioning system comprises an intake duct 1 into which fresh outside air is passed by any suitable means 10, and controlled in quantity by an intake damper 2. Beyond this damper the fresh air is mixed with recirculating air of the system, received by way of a conduit 3, and is then passed on through a heater 4 to the room R. According to the present invention, the minimum required amount of outside air which is admitted to the room is controlled by a multi-position damper control switch 5 which is located at a suitable point in the room R where it can have the attention of some person kept constantly aware of the number of occupants and of the condition of the air in the room, as for instance at a cashier's booth or head waiter's post. The switch 5 controls a multi-position damper motor 6 such for instance as is manufactured by the Minneapolis-Honeywell and the Barber-Coleman Companies. This switch comprises a contact arm 7 and a series of contact terminals which are connected to respective control terminals of the motor 6, the corresponding terminals of the switch 5 and motor 6 having like designations as will hereafter appear. The motor is driven from a power supply 8, typically a low voltage source of current of about 24 volts.

It will be understood that when the respective control terminals of the motor are connected to ground, the motor will respond to open and to close the intake damper according to which one of the control terminals of the motor is so grounded. For example, when the motor terminal designated as C is connected to ground the motor moves the intake damper closed, and as the motor terminal designated as ¼ 0 is connected to ground the motor will move the damper to a one-fourth open position. Likewise, as the additional motor terminals ½ 0, ¾ 0 and 0 are connected successively to ground, the motor will move the intake damper to positions of wider opening according to the numerical factors of the respective designations. The motor is however adapted to operate the damper very slowly. As typical values, the motor may be set to operate the damper from one position to the next within a time of from five to thirty minutes.

The switch 5 is provided for manually selecting which one of the motor control terminals shall be grounded by the control system, and for predetermining the minimum amount of fresh air which the system can supply. In the operation of my invention the switch 5 is for example set to supply the minimum practical amount of fresh air which is needed for the particular conditions present; additional supplies of fresh air are then supplied automatically for inside temperature correction according to the value of the inside temperature of the room and the direction of variance of the outside temperature relative to that of the inside—that is, according to whether the outside temperature is below or above the inside temperature. The control of the supply of outside air according to the inside temperature is effected by a thermostat 15, and that according to the relative outside-inside temperature is effected by a differential thermostatic system generally referred to as 12.

The differential thermostatic system 12 includes a double-throw switch 13 having three terminals 13a, 13b and 13c of which the terminals 13a and 13c are connected to the motor terminal designated as 0—which is the terminal to be grounded to place the intake damper into fully open position— and the intermediate terminal 13b is connected to the contact arm 7 of the damper control switch 5. Shiftable between contact terminals 13a and 13b is pole member 13', and between contact terminals 13b and 13c is pole member 13". These pole members are connected respectively to contact points H and L of the thermostat 15 abovementioned. This thermostat is of any single-pole double-throw type including a pole member 15' settable for actuation at any temperature within a suitable range. The thermostat 15 is arranged so that its pole member will close with the contact H when the ambient temperature is higher than that of the setting of the thermostat and, vice versa, will close with contact L when the ambient temperature is below that setting. In the structure so far described, it is seen that when the poles of switch 13 occupy leftward positions, the motor terminal 0 is connected to contact H of the thermostat 15 and the damper control arm 7 is connected to contact L of this thermostat. When the poles of switch 13 occupy rightward positions, these connections are reversed, the motor control terminal 0 being now connected to contact L and the control arm 7 to contact H.

The poles of switch 13 are shifted between their respective positions by a differential thermostat of the thermostatic system 12 abovementioned, this shifting being according to whether the outside temperature is below or above the inside temperature. The thermostat may be any one of various types—e. g., bellows, bimetallic, Bourdon, bolometer tube, etc.—and for purposes of illustration is here shown as being of the bellows type comprising respective bellows 17 and 18 connected by capillary tubes 17' and 18' to the bulbs 17" and 18". The bulbs are immersed respectively in the outside and inside atmospheres, they being for instance appropriately placed in the intake conduit 1 and room R as is shown, and the bulbs and bellows are filled with any suitable temperature-responsive fluid. The bellows operate in opposing directions on a pivoted switch arm 19, which may be biased over center by a spring mechanism 20, as is shown in Figure 4, to provide a snap movement of the arm. This arm carries contacts 21 adapted for engagement with contact terminals 22 and 22' as the arm is swung over center into its terminal positions. The arm is connected by lead 23 to the voltage source 8, and the contact terminals 22 and 22' are connected through left and right solenoid sections 24 and 24' to ground. These solenoid sections have a common armature 25 coupled to the poles 13' and 13" of the switch 13. When the switch arm 19 is swung to the left into engagement with contact terminal 22 the voltage source 8 is closed through the left solenoid section 24 and the poles of switch 13 are moved to the left; vice versa, when the switch arm 19 is actuated to the right, the rightward solenoid section 24' is energized and the poles of switch 13 are moved to the right. Thus, it is seen that should the inside temperature exceed the outside temperature by a predetermined amount, the switch 13 is actuated to connect the motor control terminal 0 and the damper control arm 7 respectively to the contacts H and L of the thermostat 15, and that should the outside temperature exceed the inside temperature by a predetermined amount the connections of the motor control terminal 0 and control arm 7 to the thermostat 15 are reversed.

The heater 4 abovementioned is regulated according to the inside temperature by a settable thermostat 26 including a bimetallic pole element 26' and a cooperating contact 26a which close when the temperature is below the setting of the thermostat, and open when the temperature is above that setting. As a typical case, this thermostat will be set a few degrees below that of the room thermostat 15. The pole element 26' is connected to ground and the contact 26a is connected in a circuit 31 through an on-off switch 29 and a valve-actuating mechanism 30 to the voltage source 8. When the circuit through the mechanism 30 is closed it operates a valve 32 to open position so as to admit steam or other heating fluid to the heater 4. Thus as when the on-off switch is closed, heat will be supplied to the circulating air whenever the inside temperature is below a predetermined set value, and the heat is cut off whenever the inside temperature exceeds that value.

The operation of the air-conditioning system above described may be understood by taking a typical case wherein say the room R is considered to be a restaurant. On a cold morning the differential thermostat will have actuated the switch arm 19 to the left and by the switch 13 will have connected the motor control terminal 0 to the contact H and the damper control arm 7 to the contact L of thermostat 15. As the temperature in the restaurant will now be below the settings of the thermostats 26 and 15, the thermostat 26 will be closed and the contact L of thermostat 15 will be grounded. When an attendant arrives he will close the on-off heater switch 29 or adjust the setting of the thermostat 26, as the case may be. Also he will move the damper control switch arm 7, as from a neutral position, to closed position C. This will under the circumstances cause the motor control terminal C to be connected to ground and the intake damper to be moved gradually to closed position, provided it is not already closed. The admission of cold outside air is thus prevented, and the recirculating inside air is gradually heated to the desired temperature, at which time the heat supply will be automatically shut off. If for any reason the inside temperature should become appreciably too high, the pole of thermostat 15 will move over to contact H and thus ground the motor control terminal 0. This will cause the intake damper to be moved gradually toward fully open position. Typically, the motor will be so set (in rate of operation) that the intake of fresh cold air will be sufficient to lower to inside temperature to the desired value before the intake damper has reached fully open position, the extent of opening depending on the relative coldness of the outside air. When that desired inside temperature is reached the pole of thermostat 15 will break connection with contact H and the motor will come to a standstill, holding the intake damper at whatever partially open position it has reached. If the inside temperature continues to cool off, the pole of thermostat 15 will make connection with contact L to again ground control arm 7. The motor will now start up in reverse direction and gradually move the intake damper toward closed position. If the inside temperature becomes too high before the intake damper reaches fully closed position, the motor will again come temporarily to a standstill while the intake damper is in partially-closed position and be then reversed to again gradually open the intake damper more and more. In this way the room thermostat 15 controls the intake damper to cause it to float between a fully open position and a less open position determined by the setting of the damper control arm 7—which is a fully closed position in the particular instance.

As the patrons arrive the attendant will move the damper control arm 7 to one of the partially open positions, say first to ¼ 0, to limit the closing of the intake damper 2 to that position as a minimum. More cold outside air will now be admitted to supply the necessary fresh air and to counteract the body heat of the patrons. As more people come and go, the intake damper control will be adjusted accordingly, but always set at a minimum value required to supply the necessary amount of fresh air for the particular circumstances. In every case though the room thermostat 15 will so control the intake damper to cause it to float between the minimum position corresponding to the setting of the damper control arm and a fully open position as a maximum. For instance, if during the day the sun should increase in intensity and the stored heat of the building should increase, the outside air which is admitted for the particular fractional setting of the damper control will have less cooling effect and the inside temperature will rise. The thermostat 15 will then be actuated to H position and the damper motor will operate to move the intake damper 2 toward fully open position. As more of the colder outside air is thus admitted, the inside temperature is lowered and the pole of thermostat 15 again makes connection with contact L to reverse the damper motor and gradually move the intake damper toward a minimum position corresponding to the setting of the damper control arm. Thus, it is seen that the minimum supply of fresh air required for the number of people present is controlled by the damper control switch 5, and that whatever cooling of the inside air is needed is effected automatically by the admission of more or less outside air. Of course, if for any reason the inside temperature should fall below normal value during the day, the heater 4 will be turned on by the thermostat 26 and the inside temperature will be restored to normal value.

When during the warmer months the outside temperature becomes higher than that of the inside, the differential thermostat 12 will be actuated to reverse the connections of the damper control switch arm 7 and of the motor control terminal 0 relative to the thermostat 15. Now, when the inside temperature is too cool the room thermostat 15, in moving to L position, starts the motor in the direction to open the intake damper, instead of to close it as in the case where the outside temperature is colder than the inside temperature. Vice versa, when the inside temperature gets too high the room thermostat 15 will reverse the motor to gradually return the intake damper to the minimum position corresponding to the setting of the damper control switch. Thus, the amount of fresh air admitted is restrictively regulated automatically to supply additional amounts only when additional inside heat is required so as not to raise the inside temperature unnecessarily or place an unnecessary burden on whatever cooling system may be provided. Of course, during these warmer months the on-off control 29 for the heater 4 will be kept in open position, or if kept in closed position the thermostat 26 will be set at a minimum value so as to turn the heater on only when the inside temperature should fall considerably due to an unseasonable drop in the outside temperature.

For purposes of description, I may term the differential between the inside temperature and a predetermined value thereof as being positive and negative, or of plus and minus signs, when the inside temperature is respectively above and below that predetermined value. Similarly, I may term the differential between the outside and inside temperature as being positive and negative when the outside temperature is respectively above and below the inside temperature. Thus, it will be observed that my system operates to admit further outside air when the inside temperature varies from its predetermined value by a given amount, and that it varies at an increasing rate when the differentials between the inside temperature and that predetermined value and between the outside temperature and the inside temperature have opposite signs and at a decreasing rate when these differentials have like signs.

It will be understood that as an alternative to controlling the damper control switch 5 by manual means, there may be employed any of various automatic devices herein generally referred to as 33. For instance, the switch may be controlled according to the number of occupants in the room at any one time by a suitable counting device actuated according to the number of people who have entered and left the room. Also, the switch may be controlled automatically according to the condition of the air in the room—as in respect to humidity, percentage of content of carbon dioxide, the extent of foul odors present, etc.—by any suitable form of the device 33.

The embodiment shown in Figure 2 distinguishes from that above described in that it is provided with both heating and cooling units, and these units are controlled automatically by the intake damper control system. In this second embodiment those components which are identical with the corresponding ones in Figure 1 and which have the same mode of operation are given the same reference characters and are not herein further described other than in respect to their relation to the new and modified components of the system.

The cooling unit in this second embodiment, herein referred to as 35, is placed in the inlet duct 1 beyond the intake damper, as for example just before the heater 4. This cooling unit is supplied with a suitable cooling medium through a regulating valve 36, the valve being normally closed and moved to open position by an electrically actuated mechanism 37. This valve-actuating mechanism 37 and the valve-actuating mechanism 30 of the heater unit 4 are serially connected in respective circuits 38b and 38a which run from the high potential side of the voltage source to respective contact terminals 40a and 40b of a single-pole double-throw switch 40, this switch having a pivoted arm 40' as its pole element. The arm 40' is biased rightwardly into contact with contact terminal 40b by a spring 41, and is actuated to the left to make contact with contact terminal 40a by a solenoid 42 and cooperating armature 43. The solenoid is connected at one end to the voltage source just mentioned and at the other end to contact L of the room thermostat 15. The switch arm 40' has electrical connection through a lead 43' to a switch arm 44 on the damper motor. For simplification of showing, this switch arm is shown as being integral with the drive arm of the damper motor, but it will be understood that the arm is insulatedly mounted in any suitable way. This switch arm 44 cooperates with a series of contact terminals which are connected respectively to the motor control terminals, the contact terminals being here given the designations of the respective motor terminals with prime notation. It will be seen that except for the additional structure just described, this second embodiment is the same as my first embodiment.

The operation of this second embodiment is such that when the room thermostat sets the damper motor into operation to move the intake damper towards open or closed position, as the case may be, and the damper is moved to a limiting position in the effort of the system to correct the inside temperature to the desired value, then the heating or cooling unit—whichever is required—is put automatically into operation. For instance, say the outside temperature is cool, and the inside temperature has become too warm, and the damper control arm 7 is in position ½ O. The switch 13 of the differential thermostatic system will be in a leftward position and the pole of thermostat 15 will have made connection with contact H. Solenoid 42 is not now energized and the control arm 40' of switch 40 is held in contact with the contact terminal 40b by the spring 41. The damper motor will now be moving the intake damper gradually to fully open position. If the resulting increase in admission of outside air provides the necessary inside temperature correction before the intake damper reaches fully open position, the motor will come to a standstill, and may next be reversed to gradually close the intake damper, as in the manner above described in connection with my first embodiment. However, if the increasing admission of outside air is insufficient to give the necessary inside temperature correction, then the intake damper will be moved to fully open position and the cooling unit will be put into operation as an incident to the intake damper reaching that position. The placing of the cooling unit into operation is effected as follows: when the intake damper reaches fully open position, switch arm 44 makes connection through contact O' with motor terminal O and thus to ground since this terminal has ground connection through contact 13a of switch 13 and contact H of room thermostat 15. This serves to ground switch arm 40' to complete the circuit from the high potential side of the voltage source through the valve-actuating mechanism 37, thereby causing the valve 36 to be opened and refrigerating medium to be supplied to the cooling unit 35. When the inside temperature has been lowered to proper value, the room thermostat breaks connection with contact H and thereafter makes connection with contact L. The breaking of connection with contact H removes the ground from motor terminal O and thus breaks the circuit of valve-actuating mechanism 37 to cause the valve 36 to shut off the cooling unit. When the room thermostat makes connection with contact L, ground connection is restored to damper control arm 7 and the motor is put into operation to move the intake damper back gradually to a ½ open position corresponding to the setting of the damper control arm. The energizing circuit through the solenoid 42 will now be closed and the switch arm 40' will be held in contact with contact terminal 40a. This connects the energizing circuit of valve-actuating mechanism 30 from the high potential side of the voltage source to motor terminal O, presuming that the intake damper has not yet moved sufficiently from a wide-open position to break connection of the arm 44 with the contact O'; however, the motor terminal O is not now grounded, and the heater valve 32 is not actuated to open position. If, however, the gradual closing of the intake damper does not restore the inside temperature to the desired value—the room temperature being now too cool—and the intake damper is moved all the way to ½ open position, then as soon as the switch arm 44 makes connection with contact ½ O' the energizing circuit through the valve-actuating mechanism 30 is completed (through control arm 7, contact 13b, pole 13'', and contact L of the room thermostat) and the heater valve 32 is opened to supply heat to the recirculating air of the conditioning system.

If the outside air should become warmer than the inside, the differential thermostat will actuate the switch 13 to the right, and the reverse operations will take place from those above described. For instance, when the inside temperature has become too cool, the room thermostat will be in position L and the intake damper will be moving gradually to fully open position. If the greater admission of outside air fails to bring the inside temperature up to the desired value, the intake damper will be moved on to wide-open position and the heater valve 32 will be opened, the circuit of the actuating mechanism 30 for this valve being now completed through contact terminal 40a of switch 40, contact 0', contact 13c of switch 13 and contact L of the room thermostat. On the other hand, if the room temperature should become too warm, the room thermostat will move to contact H and start the motor in reverse direction to cause the intake damper to be gradually closed. If the gradual reduction in admission of outside air does not lower the inside temperature to the desired value, the intake damper will be closed more and more and eventually come to a minimum position corresponding to the setting of the damper control arm 7, say to a ½ open position. When the intake damper reaches this position the refrigerating valve 36 will be opened, the circuit of the actuating mechanism 37 for this valve being completed through contact terminal 40b of switch 40, contact ½ 0', contact 13b of switch 13 and contact H of the room thermostat.

It is accordingly seen that this control system of my invention operates automatically first to make all possible inside temperature correction by varying the intake of outside air. If the required inside temperature adjustment cannot however be made alone by varying the admission of outside air, then when the intake damper reaches a limiting position the heating or cooling unit is put into operation. This mode of operation provides a very efficient and economical system wherein a minimum conditioning of the inside air is required.

The embodiment shown in Figure 3 has also heating and cooling units as is shown in Figure 2, but these units are provided with a simplified control. Here the circuits 38a and 38b of the valve-actuating mechanisms for the heating and cooling units terminate into contact terminals 47a and 48a of respective thermostatic relay devices 47 and 48. These relays are of the delayed-action type and may for instance comprise thermal elements 47' and 48' provided with respective heater windings 47" and 48". One end of each winding runs to the voltage source 8 and the other ends are connected to respective contact terminals 47a and 48b insulatedly carried by the thermal elements for cooperation with the contact terminals 47a and 48a abovementioned; in addition these contact terminals are connected respectively to the contact terminals H and L of the room thermostat 15.

It will be seen that when the room thermostat 15 moves to position H, the energizing circuit of relay 47 is closed, and that when the room thermostat moves to position L the energizing circuit of relay 48 is closed. Also, according to the embodiment of Figure 1, the actuation of the room thermostat 15 to position H will cause the intake damper to be set into motion toward wide-open or a less open position determined by the setting of the control damper switch 5, depending upon whether the outside air is colder or hotter than the inside air; and the actuation of the room thermostat 15 to position L will cause the intake damper to be actuated in respectively reverse directions. According to this embodiment, however, the relays 47 and 48 are timed to be substantially slower than is the time setting of the damper motor. For instance, as a typical value, the relays may be set so that their operating periods is just longer than the period at which the damper motor is set to actuate the intake damper between fully closed and fully open positions, the term "operating period" for the relays being here used to mean the time duration between the instant energizing current is supplied to the relay and the instant following at which the relay contact terminals close. As so adjusted the operation of the system will be as follows:

Say the intake damper is being gradually opened to lower the inside temperature as when the outside temperature is relatively cool, or to raise the inside temperature as when the outside temperature is relatively warm, and the greater intake of outside air fails to provide the desired inside temperature correction and the intake damper is moved on to wide-open position. Then a predetermined interval after the intake damper reaches wide-open position, as determined by the differential between the setting of the damper motor and that of the thermostatic relays 47 and 48, the contact terminals are closed of whichever of the relays is called into play, and the heating or cooling unit is turned on as the case may be. When the necessary inside temperature adjustment has been made, the room thermostat 15 breaks connection with contact terminal H and thus also opens the energizing circuit of the thermostatic relay 47 or 48 just actuated. When the room thermostat next makes connection with contact terminal L, the damper motor will be set in operation to gradually close the intake damper, and also energizing current will be supplied to the other of the relays 47 and 48. If the gradual closing of the intake damper fails to give the required inside temperature correction, and the intake damper is moved to the minimum position corresponding to the setting of the damper control switch, then again after a predetermined interval following the time the intake damper reaches its minimum position, the other of the heating and cooling units will be turned on from that turned on in the case abovementioned, presuming that the differential between the outside and inside temperatures has been maintained in the same direction. Of course, when the outside-inside temperature differential reverses direction, the reverse actions will take place.

I have herein shown and described certain preferred embodiments of my invention, but these embodiments are to be considered as illustrative and not as limitative of my invention, as the same are subject to many changes and modifications without departing from the scope of my invention, which I endeavor to express according to the following claims.

I claim:

1. The method of conditioning the air within an enclosed space subjected to varying amounts of air-vitiating constituents and varying proportions of occupancy, which comprises adjustably admitting outside air at minimum rates determined by the proportion of occupancy and of air-vitiating constituents, and regulating the inside temperature by governing the admission of further outside air both according to whether the inside temperature is above or below a predetermined value and the outside temperature is above or below the inside temperature.

2. The method of conditioning the air within an enclosed space subjected to varying amounts of air-vitiating constituents and varying proportions of occupancy, which comprises adjustably admitting outside air at minimum rates determined by the proportion of occupancy and of air-vitiating constituents, governing the admission of further outside air between said minimum limit and a predetermined maximum limit according to the relative inside and outside temperatures to regulate the inside temperature, and locally subjecting the inside space to a temperature-changing influence only when said further admission has reached a limiting value.

3. The method of conditioning the air within an enclosed space subjected to varying amounts of air-vitiating constituents and varying proportions of occupancy, which comprises adjustably admitting outside air at minimum rates determined by the proportion of occupancy and of air-vitiating constituents, governing the admission of further outside air between said minimum limit and a predetermined maximum limit to regulate the inside temperature, and locally subjecting the inside space to a temperature-correcting influence when the inside temperature remains at variance from a desired value by a predetermined amount after the elapse of a predetermined interval following the time said further admission has reached a limiting value.

4. Air-conditioning apparatus for an enclosed space comprising a blower system adapted for delivering outside air to the inside at varying rates, means settable to predetermine the minimum delivery rate of said blower system, and means responsive to the inside temperature and to whether the outside temperature is above or below the inside temperature to cause said blower system to operate variably between said minimum rate and a predetermined maximum rate whereby to produce a stabilizing influence on the inside temperature.

5. Air-conditioning apparatus for an enclosed space comprising a blower system adapted for delivering outside air to the inside at varying rates, respectively controllable cooling and heating means, temperature-responsive means regulating said blower system to cause the same to operate at delivery rates between predetermined minimum and maximum values, and means operative automatically when said blower system reaches a limiting rate of delivery to place said heating and cooling means into operation selectively according to whether the outside temperature is above or below the inside temperature.

6. Air-conditioning apparatus for an enclosed space comprising a blower system adapted for delivering outside air to the inside at varying rates; local temperature-correcting means; temperature-responsive means controlling said blower system to cause the latter to change in its delivery rate between predetermined minimum and maximum values upon a predetermined variation of the inside temperature from a set value; and means controlled to put said temperature-correcting means into operation upon the elapse of a predetermined interval after said blower system has reached a limiting delivery rate and the inside temperature has remained at greater than said predetermined variation from said set value.

7. Air-conditioning apparatus for an enclosed space comprising a blower system adapted for delivering outside air to the inside at varying rates; local temperature-correcting means; temperature-responsive means controlling said blower system to cause the latter to change in its delivery rate between predetermined minimum and maximum values upon a predetermined variation of the inside temperature from a set value, said blower system being set to shift between limiting delivery rates within a predetermined time interval; delayed action means controlling said temperature-correcting means and having an operating period at least greater than the said time interval of said blower system; and means to put said delayed-action means into operation upon the start in change of delivery rate of said blower system.

8. Air-conditioning apparatus comprising a blower system adapted for delivering outside air to the inside at predetermined and gradually varying rates; means settable to predetermine the minimum delivery rate of said blower system; temperature-responsive means controlling said blower system and operable upon a predetermined variation in the inside temperature from a set value to cause a gradual change in said delivery rate between said minimum and a maximum value; differential temperature-responsive means for controlling the direction of change in said delivery rate according to whether the outside temperature is above or below the inside temperature; respectively controllable heating and cooling means; and means operatively connecting said two responsive means to said heating and cooling means for selectively putting the latter into operation when said delivery rate reaches a limiting value.

9. An air-conditioning system comprising means for conducting outside air to an enclosed space to be conditioned; a damper for controlling the admission of the air to said space; a reversible motor operating to variably adjust said damper between open and closed positions; heating means; cooling means; a room thermostat in said space for putting said motor into operation upon a predetermined variation of the inside temperature from a set value; a differential thermostat responsive to whether the outside temperature is above or below the inside temperature to control the direction of operation of said motor and to select between said heating and cooling means; and means to put the selected one of the heating and cooling means into operation when said damper reaches a limiting position.

10. In an air-conditioning system for an enclosed space: the combination of a damper for variably controlling the admission of outside air to said space; a motor for actuating said damper; a thermostat operatively connected to said motor and responsive to changes of temperature in said space to govern the operation of said motor; and a second thermostat having two conjointly acting heat sensitive elements one responsive to temperature changes in said space and the other responsive to temperature changes in the outside atmosphere, said second thermostat operating to change the circuit connections between the other thermostat and said motor upon the outside temperature rising above or falling below the inside temperature.

11. In an air-conditioning system for the air circulated in an enclosed space: heating and cooling means; thermostatic means responsive to the air temperature in said space for governing the operation of said heating and cooling means; a motor actuated damper to admit varying amounts of outside air to the circulated air in the area; a second thermostatic means responsive only to a difference between the outside and inside temperatures, said motor actuated damper being under the joint control of said first thermostatic means and said second thermostatic means; and a control device for determining the minimum volume of outside air admitted by said damper according to the proportional occupancy of said space.

12. In an air-conditioning system for the air circulated in an enclosed space: the combination of heating and cooling means; thermostatic means responsive to the air temperature in said space for controlling said heating and cooling means; a motor actuated damper to admit varying amounts of outside air to the circulated air in said space; a second thermostatic means responsive only to a difference between the outside and inside temperatures, said motor actuated damper being under the joint control of said first thermostatic means and said second thermostatic means; and a control device for changing at will the operative range of said damper.

13. In an air-conditioning system for the air circulated in an enclosed space: the combination of heating means and cooling means; a motor actuated damper to admit varying amounts of outside air to said circulated air; a circuit making and breaking thermostat responsive to the temperature in said space for controlling the operation of said motor actuated damper; a thermostatic device provided with heat sensitive elements subject to temperature fluctuations of the outside temperature and temperature of said enclosed space and operating in accordance with a difference in said temperatures to condition the controlling operation of said first mentioned thermostat; and a circuit control switch operable to control the minimum volume admitted by said damper predetermined by the proportioned occupancy of said space.

14. In an air-conditioning system for the air circulated in an enclosed space: the combination of a heating means; cooling means; a motor actuated damper to admit varying amounts of outside air to said circulated air; a circuit making and breaking thermostat responsive to the temperature in said space for controlling the operation of said motor actuated damper; a thermostatic device provided with heat sensitive elements subject to temperature fluctuations of the outside temperature and temperature of said enclosed space and operating in accordance with a difference in said temperatures to condition the controlling operation of said first mentioned thermostat; a circuit control switch operable to control the minimum volume admitted by said damper predetermined by the proportional occupancy of said space; and delayed-action relays controlled by said thermostats and controlling the operation of said heating means and said cooling means respectively to raise or lower the space temperature to a predetermined temperature.

15. The method of conditioning the air within an enclosed space which comprises admitting outside air to said space at a varying rate, causing said rate to increase and decrease respectively as the inside temperature falls below and rises above a predetermined value while the outside temperature is above the inside temperature, and reversing said directions of variation in said rate with change in the inside temperature upon the outside temperature falling below the inside temperature.

16. The method of conditioning the air within an enclosed space subjected to varying amounts of air-vitiating constituents, which comprises adjustably admitting outside air at minimum rates determined by the proportion of said air-vitiating constituents, variably admitting further outside air upon the inside temperature varying above and below a predetermined value, and controlling the direction of variation of said further admission according to the direction of variation of the inside temperature relative to said predetermined value and whether the outside temperature is above or below the inside temperature.

17. The method of conditioning the air within an enclosed space, which comprises admitting outside air at varying rate, increasing said rate when the differentials between the inside temperature and a predetermined value thereof and between the outside temperature and the inside temperature have opposite signs and decreasing said rate when said differentials have like signs.

18. The method of conditioning the air within an enclosed space subjected to varying amounts of air-vitiating constituents, which comprises adjustably admitting outside air at minimum rates determined by the proportion of said air-vitiating constituents, admitting further outside air upon the inside temperature varying from a predetermined value by a given amount, and changing the direction of variation of said admission of further outside air when the differential between the inside temperature and said predetermined value changes sign relative to that of the differential between the outside temperature and the inside temperature.

19. The method as set forth in claim 18 wherein the rate of admission of further outside air is held constant while the differential of the inside temperature from said predetermined value is within the value of said given amount.

20. The method of conditioning the air within an enclosed space subjected to varying amounts of air-vitiating constituents, which comprises adjustably admitting outside air at minimum rates determined by the proportion of said air-vitiating constituents, and admitting further outside air when the inside temperature varies from a predetermined value by a given amount and the differentials between the inside temperature and said predetermined value and between the outside temperature and the inside temperature have opposite signs.

21. Air-conditioning apparatus for an inside space comprising means for delivering outside air to said inside space at varying rates, means settable to predetermine the minimum rate of said delivering means; control means, operatively connected with said delivering means and responsive to the inside temperature upon the inside temperature varying from a predetermined value by a given amount, for causing said delivering means to deliver outside air to said space at varying rates above said minimum rate; and means associated with said control means for causing said delivering means to operate at an increasing rate when the differentials between the inside temperature and said predetermined value and between the outside temperature and the inside temperature have opposite signs and at a decreasing rate when said differentials have like signs.

22. The method of conditioning the air within an enclosed space which comprises adjustably admitting outside air at predetermined minimum rates dependent upon the relative occupancy of the space, and controlling the admission of further outside air at varying rates depending on the inside temperature and on whether the outside temperature is above or below the inside temperature.

EARL R. SNAVELY.